US010014103B2

(12) United States Patent
Peck, Jr.

(10) Patent No.: US 10,014,103 B2
(45) Date of Patent: Jul. 3, 2018

(54) BALANCING MULTIPLE TRANSMISSION LINES FORMING A SINGLE PHASE OF AN ELECTRICAL POWER DISTRIBUTION SYSTEM

(71) Applicant: The Boeing Company, Chicago, IL (US)

(72) Inventor: James L. Peck, Jr., Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 547 days.

(21) Appl. No.: 14/668,556

(22) Filed: Mar. 25, 2015

(65) Prior Publication Data

US 2016/0285429 A1 Sep. 29, 2016

(51) Int. Cl.

| | |
|---|---|
| ***H04B 3/28*** | (2006.01) |
| ***H01F 27/28*** | (2006.01) |
| ***H01F 27/245*** | (2006.01) |
| ***H01F 3/02*** | (2006.01) |
| ***H01F 37/00*** | (2006.01) |

(52) U.S. Cl.

CPC ........... *H01F 27/2823* (2013.01); *H01F 3/02* (2013.01); *H01F 27/245* (2013.01); *H01F 37/00* (2013.01)

(58) Field of Classification Search

CPC ...... H01F 27/2823; H01F 3/02; H01F 27/245; H01F 37/00

USPC ........................................................... 333/12

See application file for complete search history.

(56) References Cited

U.S. PATENT DOCUMENTS

| | | | | |
|---|---|---|---|---|
| 9,455,084 | B2 * | 9/2016 | Peck, Jr. | H01F 27/306 |
| 2014/0312859 | A1 | 10/2014 | Ramsay et al. | |
| 2014/0347143 | A1 | 11/2014 | Oppelt | |

* cited by examiner

*Primary Examiner* — Robert J Pascal
*Assistant Examiner* — Kimberly Glenn
(74) *Attorney, Agent, or Firm* — Charles L. Moore; Moore & Van Allen PLLC

(57) ABSTRACT

A device for passively balancing multiple transmission lines forming a single phase of a power distribution system may include a magnetic core in which a magnetic flux is generable and an opening through the magnetic core. The opening is configured for receiving multiple transmission lines that form a single phase of the power distribution system. A different amplitude of alternating current flowing in each of the transmission lines generates a magnetic field about each transmission lines that has a magnitude corresponding to the amplitude of the alternating current. The magnetic fields combine to form a unified magnetic field that is absorbed by the magnetic core and generates a magnetic flux in the core. An equal amplitude of alternating current is generated in each of the transmission lines for passively balancing the transmission lines in response to the magnetic flux collapsing in the magnetic core.

20 Claims, 11 Drawing Sheets

BALANCING MULTIPLE TRANSMISSION LINES FORMING A SINGLE PHASE OF AN ELECTRICAL POWER DISTRIBUTION SYSTEM

FIELD

The present disclosure relates to electrical power distribution and electrical power distribution systems, and more particularly to a device and method for passively balancing multiple transmission lines that form a single phase of an electrical power distribution system.

BACKGROUND

Electrical power distribution systems often include multiple parallel power transmission lines per each phase of a three-phase system. The multiple parallel power transmission lines may be used between a power generation facility and a power distribution station and between power distribution stations or other facilities to reduce the weight and expense of a single transmission line having an equivalent current carrying capacity and to also reduce thermal loss of a single high capacity transmission line and to decrease impedance. FIG. 1 is a block schematic diagram of an example of a prior art three-phase electrical power distribution system 100 or portion of an electrical power distribution system that includes multiple parallel power transmission lines A1-An 102*a*-102*n*, B1-Bn 104*a*-104*n* and C1-Cn 106*a*-106 that form each phase 102, 104 and 106. A power generator 108 at a power generation facility may generate the electrical power which may be transformed by a three-phase transformer 110 to a particular voltage for transmission and power distribution by the multiple three-phase transmission lines 102*a*-102*n*, 104*a*-104*n* and 106*a*-106*n*. The power generation facility may be a nuclear plant, fossil fuel plant, hydroelectric dam, wind farm, solar facility, geothermal facility or other facility for generation of electrical power. The multiple parallel power transmission lines 102*a*-102*n*, 104*a*-104*n* and 106*a*-106*n* may transmit the electrical power from the outputs 112*a*-112*c* of the three-phase transformer 110 to the inputs 114*a*-114*c* of a power distribution transformer 116. The power distribution transformer 116 may be located at a power substation. The power distribution transformer 116 may step down the voltage for further distribution. The multiple parallel transmission lines, such as transmission lines 102*a*-102*n* supporting the same phase 102, may not carry the same current load because of different physical characteristics between the transmission line 102*a*-102*n*, such as impedance due to small variations is wire size and coupling. Currently, devices, such as variable inductors with active control circuitry to adjust the Henrys of the variable inductors may be placed on transmission lines to manage the equal distribution of current between multiple parallel paths of a single phase. However, such devices involve complex circuitry for controlling the current distribution and can add considerable expense and complexity to a system. Additionally, because of the active control circuitry, such devices are also subject to malfunctioning or failure.

SUMMARY

In accordance with an embodiment, a device for passively balancing multiple transmission lines forming a single phase of an electrical power distribution system may include a magnetic core in which a magnetic flux is generable. An opening is formed through the magnetic core and is configured for receiving multiple transmission lines that form a single phase of an electrical power distribution system. A different amplitude of alternating current flowing in each of the multiple transmission lines generates a magnetic field about each of the multiple transmission lines that has a magnitude corresponding to the amplitude of the alternating current. The magnetic fields from the multiple transmission lines are absorbed by the magnetic core and generate a magnetic flux in the magnetic core. An equal amplitude of alternating current is generated in each of the multiple transmission lines for passively balancing the multiple transmission lines in response to the magnetic flux collapsing in the magnetic core.

In accordance with another embodiment, a system for electrical power distribution may include a three-phase transformer that receives electrical power generated by a power generator and a power distribution transformer. The system may also include a three-phase power line distribution system coupling the three-phase transformer to the power distribution transformer. Each phase of the three-phase power line distribution system may include multiple transmission lines. The system may further include a device associated each phase of the three-phase power line distribution system for passively balancing the multiple transmission lines forming each phase.

In accordance with a further embodiment, a method for passively balancing multiple transmission lines that form each phase of a three-phase electrical power distribution system may include providing a magnetic core in which a magnetic flux is generable for each phase. The method may also include fitting the multiple transmission lines of each phase in an opening through the magnetic core associated with each phase. A different amplitude of alternating current flowing in each of the multiple transmission lines of a particular phase generates a magnetic field about each of the multiple transmission lines of the particular phase that has a magnitude corresponding to the amplitude of the alternating current. The magnetic fields from the multiple transmission lines of particular phase are absorbed by the magnetic core associated with the particular phase and generate a magnetic flux in the magnetic core. An equal amplitude of alternating current is generated in each of the multiple transmission lines of particular phase for passively balancing the multiple transmission lines of particular phase in response to the magnetic flux collapsing in the magnetic core.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

FIG. 41 is a graph illustrating an example of magnetic flux flowing in a magnetic core generated by the alternating current flowing in each of the multiple transmission lines passing through the magnetic core in accordance with an embodiment of the present disclosure.

DETAILED DESCRIPTION

Figure 1:
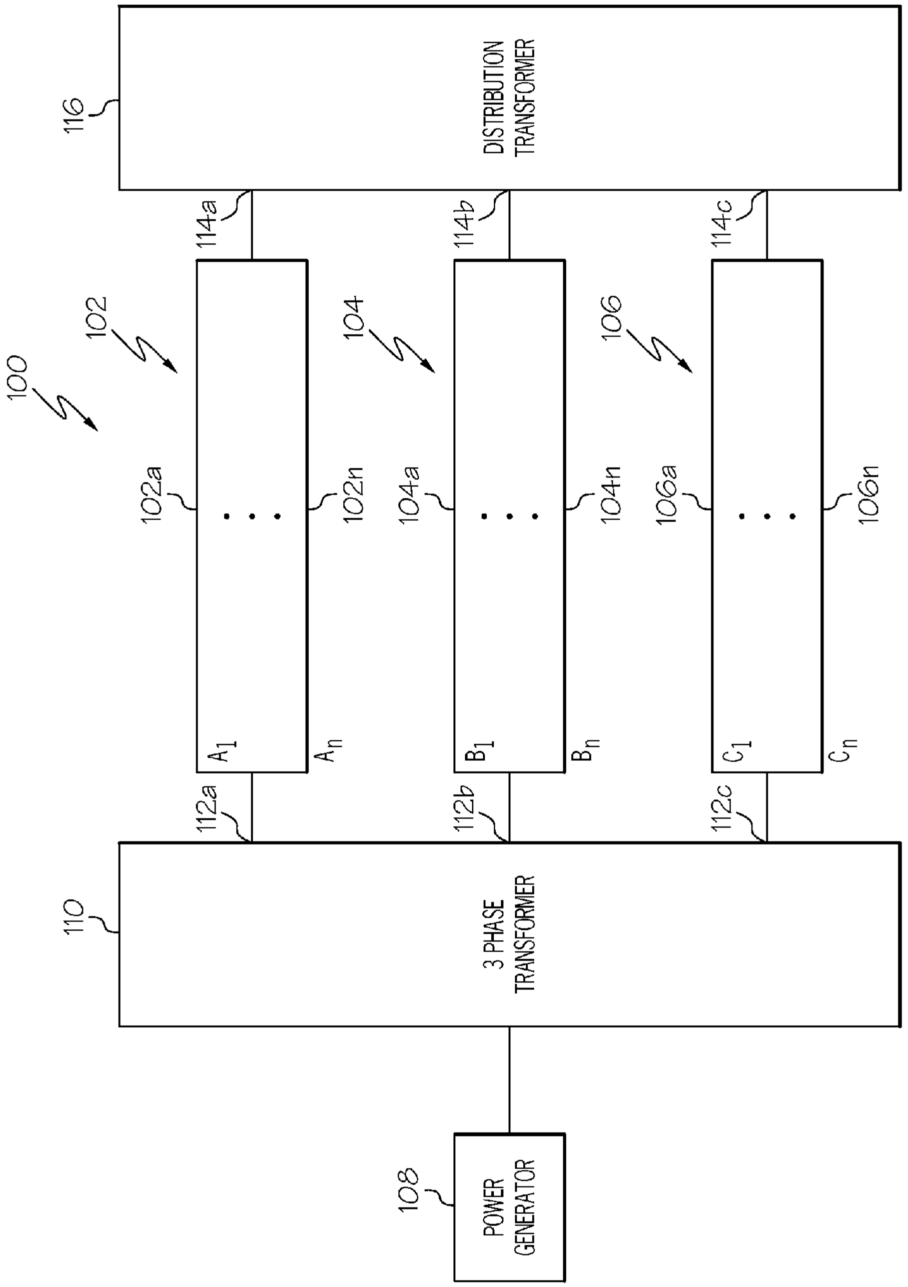
FIG. 1 (PRIOR ART)
FIG. 1 is a block schematic diagram of an example of a prior art three-phase electrical power distribution system or portion of an electrical power distribution system that includes multiple parallel power transmission lines that form each phase.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

Certain terminology may be used herein for convenience only and is not to be taken as a limitation on the embodiments described. For example, words such as “proximal”, “distal”, “top”, “bottom”, “upper,” “lower,” “left,” “right,” “horizontal,” “vertical,” “upward,” and “downward”, etc., merely describe the configuration shown in the figures or relative positions used with reference to the orientation of the figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 2:
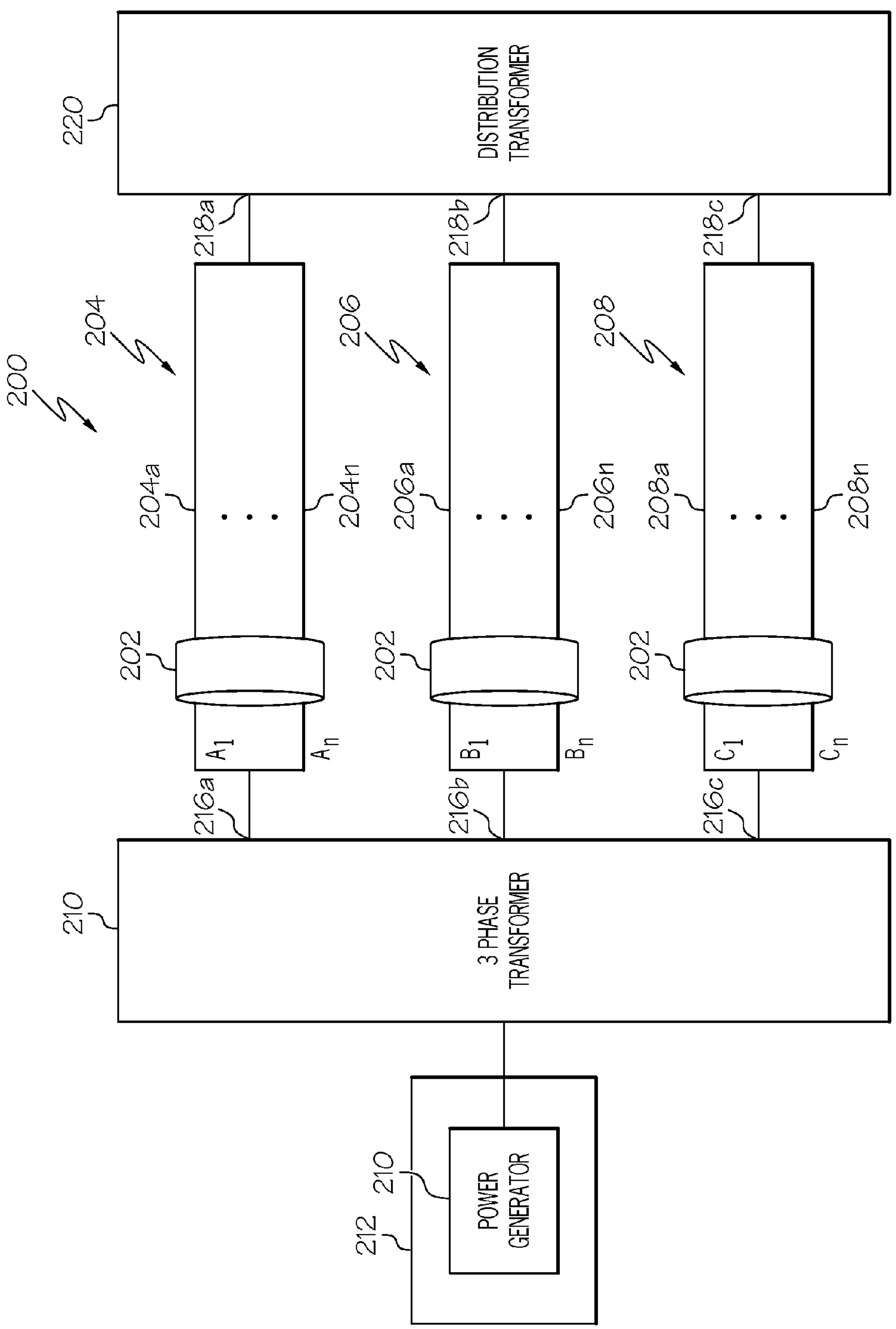
FIG. 2 is a block schematic diagram of an example of a three-phase electrical power distribution system or portion of an electrical power distribution system that includes a device for passively balancing the multiple transmission lines in each phase of the system in accordance with an embodiment of the present disclosure.

FIG. 2 is a block schematic diagram of an example of a three-phase electrical power distribution system 200 or portion of an electrical power distribution system that includes a device 202 associated with each phase 204, 206 and 208 of the three-phase system 200 for passively balancing the multiple parallel transmission lines A1-An 204*a*-204*n*, B1-Bn 206*a*-206*n* and C1-Cn 208*a*-208*n* in each phase 204, 206, 208 in accordance with an embodiment of the present disclosure. The system 200 may include power generator 210 at a power generation facility 212 that generates electrical power. A three-phase transformer 214 may transform the electrical power generated by the power generator 210 to a particular voltage for transmission and power distribution by the multiple three-phase transmission lines 204*a*-204*n*, 206*a*-206*n* and 208*a*-208*n*. The power generation facility 212 may be a nuclear plant, fossil fuel plant. hydroelectric dam, wind farm, solar facility, geothermal facility or other facility for generation of electrical power. The multiple parallel power transmission lines 204*a*-204*n*, 206*a*-206*n* and 208*a*-208*n* may transmit the electrical power from the outputs 216*a*-216*c* of the three-phase transformer 214 to the inputs 218*a*-218*c* of a power distribution transformer 220. The power distribution transformer 220 may be located at a power substation. The power distribution transformer 116 may step down the voltage for further distribution or use.

Figure 3A:
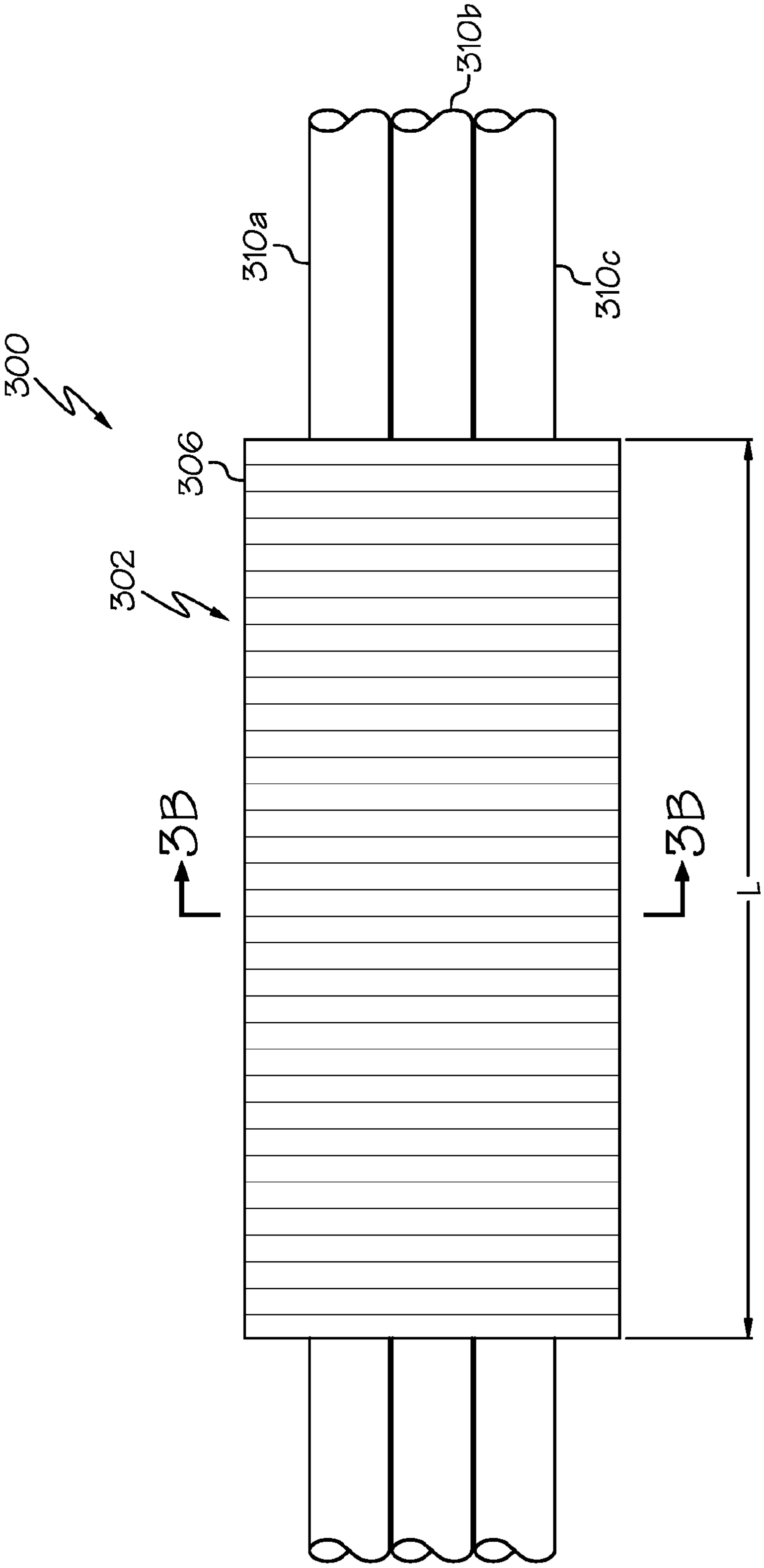
FIG. 3A is a side view of an exemplary device for passively balancing multiple transmission lines in a single phase of an electrical power distribution system in accordance with an embodiment of the present disclosure.
Figure 3B:
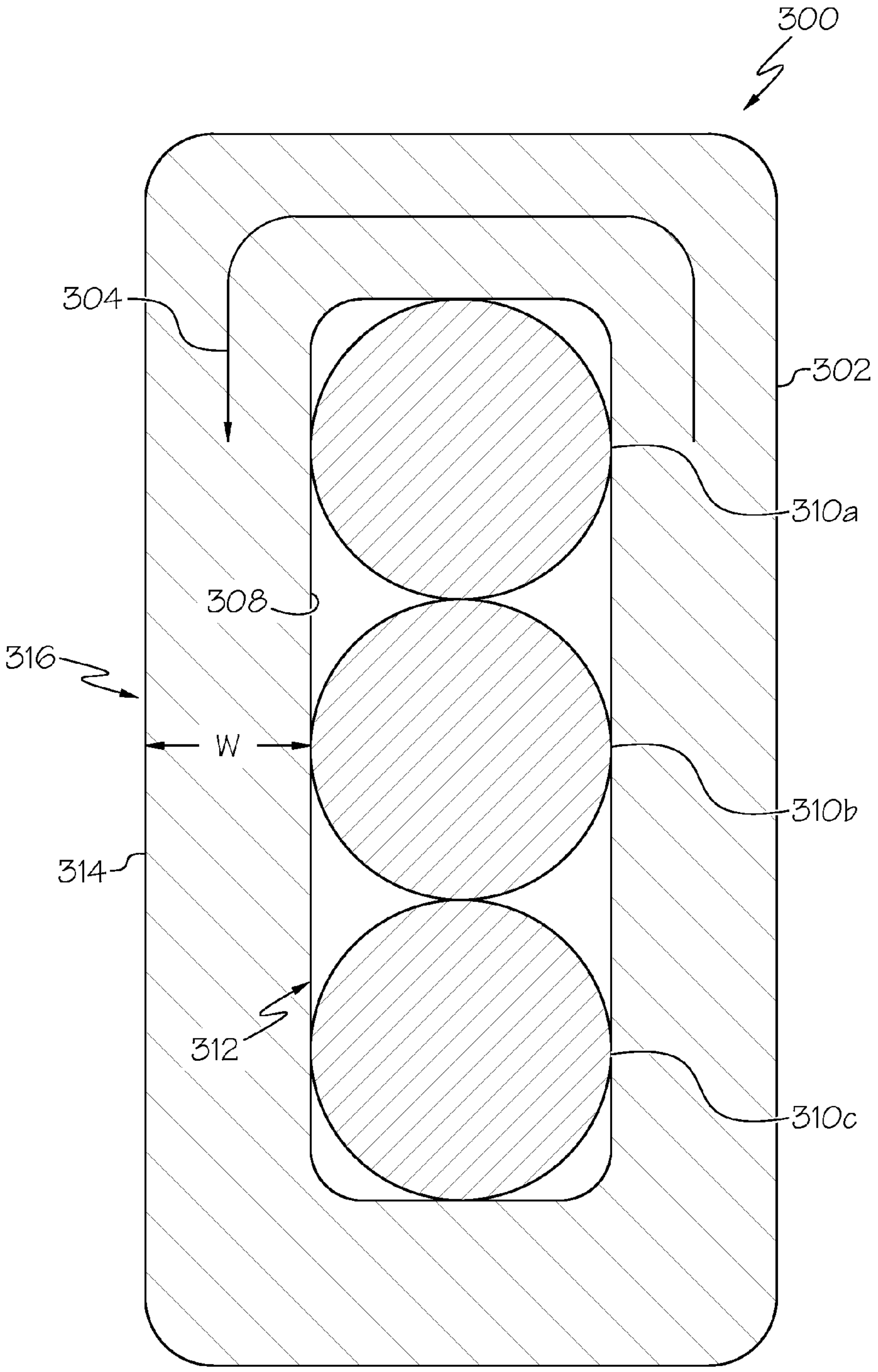
FIG. 3B is a cross-sectional view of the exemplary device of FIG. 3A taken along lines 3B-3B.

Referring also to FIGS. 3A and 3B, FIG. 3A is a side view of an exemplary device 300 for passively balancing multiple transmission lines in a single phase of an electrical power distribution system in accordance with an embodiment of the present disclosure. FIG. 3B is a cross-sectional view of the exemplary device of FIG. 3A taken along lines 3B-3B. The device 300 may be used for the device 202 in FIG. 2. The device 300 may include a magnetic core 302 in which a magnetic flux, represented by arrow 304 in FIG. 3B, may be generated as described in more detail herein. The magnetic core 302 may include a plurality of laminates or plates 306 stacked directly on one another as shown in FIG. 3A. Each of the plurality of plates may include a metallic material capable of generating the magnetic flux 304. Examples of the metallic material may include but is not necessarily limited to a silicon steel alloy, a nickel-iron alloy or any other alloy capable of generating a magnetic flux as described herein.

An opening 308 (FIG. 3B) is formed through the core 302. Each of the plates 306 may have an opening formed therein such that when the plates 306 are stacked on one another to form the core 302, the openings in the plates 306 are aligned with one another to form the opening 308 through the core 302. The opening 308 may be formed substantially in a center or central portion of the magnetic core 302. In other embodiments, the opening 308 may be off center or closer to one side of the device 300. The opening 308 may be configured for receiving multiple transmission lines 310*a*-310*c* that form a single phase of an electrical power distribution system, such as electrical power distribution system 200 in FIG. 2. Three transmission lines 310*a*-310*c* are shown extending through the opening 308 of the exemplary device 300 in FIGS. 3A and 3B. However, the device 300 may be configured to accommodate any number of transmission lines. In some embodiments, the opening 308 may be sized to accommodate a number of multiple transmission lines between two transmission lines and six transmission lines. The opening 308 may be sized to accommodate an exact number of transmission lines 310*a*-310*c* passing through the opening 308. The length "L" of the core 302 may be a predetermined number of inches compared to the length of each of the transmission lines 310*a*-310*c* which may be a predetermined number of miles. While the transmission lines 310*a*-310*c* are shown adjacent one another or stacked on one another, in other embodiments, the opening 308 may be a different shape and dimensions relative to the transmission lines and number of transmissions lines. For example, the transmission lines may be stacked in pairs, similar to the exemplary device in FIGS. 8A-8C or some other arrangement depending upon the size and shape of the opening compared to the size or diameter of the transmission lines and the number of transmission lines extending through the opening.

The opening 308 may be an elongated slot 312 similar to that illustrated in the exemplary device 300 in FIGS. 3A and 3B. The multiple transmission lines 310*a*-310*c* may be disposed adjacent one another within the elongated slot 312. The magnetic core 302 may include a predetermined width "W" from a perimeter edge 314 of the magnetic core 302 to the elongated slot 308 that may be constant about a perimeter 316 of the magnetic core 302 (FIG. 3B).

As previously discussed, when three-phase power is applied to the three-phase power distribution system, such as system 200 in FIG. 2, or a voltage of the three-phase voltage from transformer 110 is applied to each of the phases 102, 104 and 106, a different current load may be carried in each of the multiple transmission lines 102*a*-102*n*, 104*a*-104*n* and 106*a*-106*n* of each phase 102, 104 and 106, or a different amplitude of alternating current may flow in each of the multiple transmission lines of each phase 102, 104 and 106 because of different physical characteristics between the transmission lines of each phase 102, 104 and 106. As previously discussed, examples of different physical characteristics may include, but is not necessarily limited to, impedance due to small variations is wire size, coupling between the transmission lines 310*a*-310*c* and any other differences in characteristics that may cause the current load in each of the parallel transmission lines 310*a*-310*c* for a phase to be different. Accordingly, the transmission lines 310*a*-310*c* supporting a single phase of a three phase power distribution system may each carry of different current load or different amplitude of current may flow in each transmission line 310*a*-310*c*. The different amplitude of current flowing in each of the multiple transmission lines 310*a*-310*c* generates a magnetic field about each of the multiple transmission lines 310*a*-310*c* that has a magnitude corresponding to the amplitude of the alternating current flowing in each respective transmission line 310*a*-310*c*. The magnetic fields from the multiple transmission lines 310*a*-310*c* combine to form a unified magnetic field that is absorbed by the magnetic core 302 and generates the magnetic flux 304 in the magnetic core 302. Based on the right-hand rule, electric current flowing out of the page of FIG. 3B in the transmission lines 310*a*-310*c* through elongated opening 308 will cause a magnetic flux flow in the direction of arrow 304 in the example in FIG. 3B. If the current flows in the opposite direction in the transmission lines 310*a*-310*c* (into the page), the direction of the magnetic flux flow will be opposite to that shown in the example of FIG. 3B. Accordingly, the magnetic flux flow will be in the opposite direction each half cycle of the alternating current flowing in the transmission lines 310*a*-310*c*.

Figure 4A:
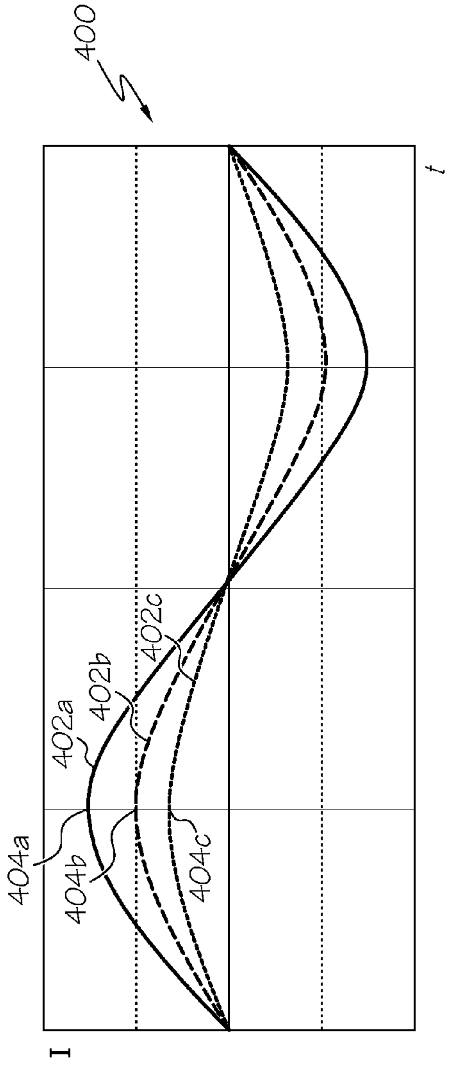
FIG. 4A is a graph illustrating an example of a different amplitude of alternating current or current load flowing in each of the multiple parallel transmission lines supporting the same phase because of a variation in impedance between the lines caused by physical wire and coupling variations.
Figure 4B:
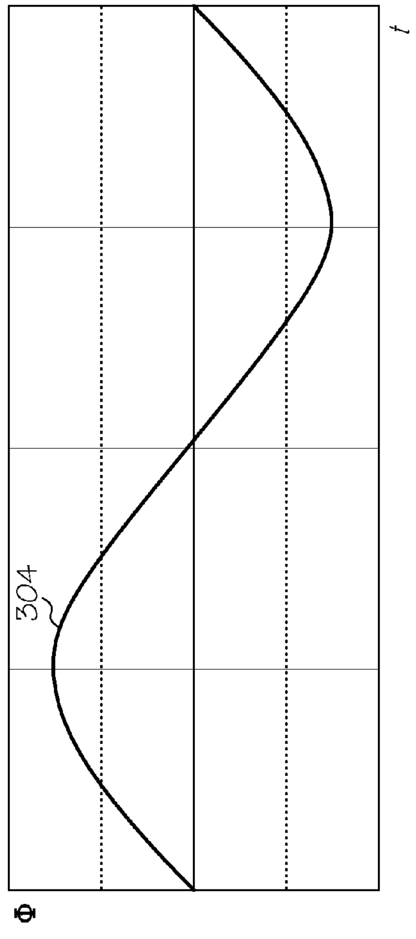

Referring also to FIGS. 4A and 4B, FIG. 4A is a graph 400 illustrating an example of a different amplitude of alternating current waveforms 402*a*-402*c* or current load flowing in each of the multiple parallel transmission lines 310*a*-310*c* supporting the same phase because of a variation in impedance between the lines caused by physical wire and coupling variations. The vertical scale is current (I) and the horizontal scale is time (I). The alternating current waveform 402*b* may be the normal designed current load for the each of the transmission lines 310*a*-310*c*.

FIG. 4B is a graph illustrating an example of the magnetic flux 304 flowing in a magnetic core 302 generated by the alternating current 402*a*-402*c* flowing in each of the multiple transmission lines 310*a*-310*c* passing through the magnetic core 302 in FIGS. 3A and 3B in accordance with an embodiment of the present disclosure. The vertical scale is magnetic flux ((@) and the horizontal scale is time (t). The horizontal scales in FIGS. 4A and 4B are aligned with one another. Accordingly, as illustrated in FIGS. 4A and 41, the magnetic flux 304 will increase and decrease in amplitude and will flow in an opposite direction in the magnetic core 302 corresponding to the alternating current 402*a*-402*c* in each of the transmission lines 310*a*-310*c*. When the alternating current 402*a*-402*c* flowing in each transmission line 310*a*-310*c* reaches a peak 404*a*-404*c* and begins to decrease in amplitude, the magnetic flux 304 also collapses or decreases in strength or amplitude as shown in FIG. 4B. When the magnetic flux 304 collapses, the electromagnetic energy stored in the magnetic core 302 causes a reverse magnetic field that is equally absorbed by or equally effects each of the transmission lines 310*a*-310*c* and an equal amplitude of alternating current is generated in each of the multiple transmission lines 310*a*-310*c*. Accordingly, the equal amplitude alternating current generated in each transmission line 310*a*-310*c* passively balances the multiple transmission lines 310*a*-310*c* in response to the magnetic flux 304 collapsing in the magnetic core 302. Similarly, any differences when the amplitude of the current waveforms 402*a*-402*c* go negative will be equalized by the magnetic flux generated in the core 302 flowing in the opposite direction, from that represented by arrow 304, collapsing from a most negative amplitude of the alternating currents 404*a*-404*c*.

The magnetic core 302 of the device 300 may have a size or width "W" and length "L" for absorbing a sufficient amount of the magnetic fields generated by the current flowing in the transmission lines 310*a*-310*c* to generate a magnetic flux 304 that passively balances the current flowing in the transmission lines 310*a*-310*c* when the magnetic flux 304 collapses. The size or diameter of the transmission lines 310*a*-310*c* may be much smaller than the opening 308 so long as there is sufficient magnetic coupling between the transmission lines 310*a*-310*c* and the magnetic core 302 so that a magnetic flux of sufficient strength or magnitude can be generated in the magnetic core 302 by the magnetic fields around the transmission lines 310*a*-310*c* that can generate an equal current load in the transmission lines 310*a*-310*c* when the magnetic flux collapses in the core 302.

Figure 5:
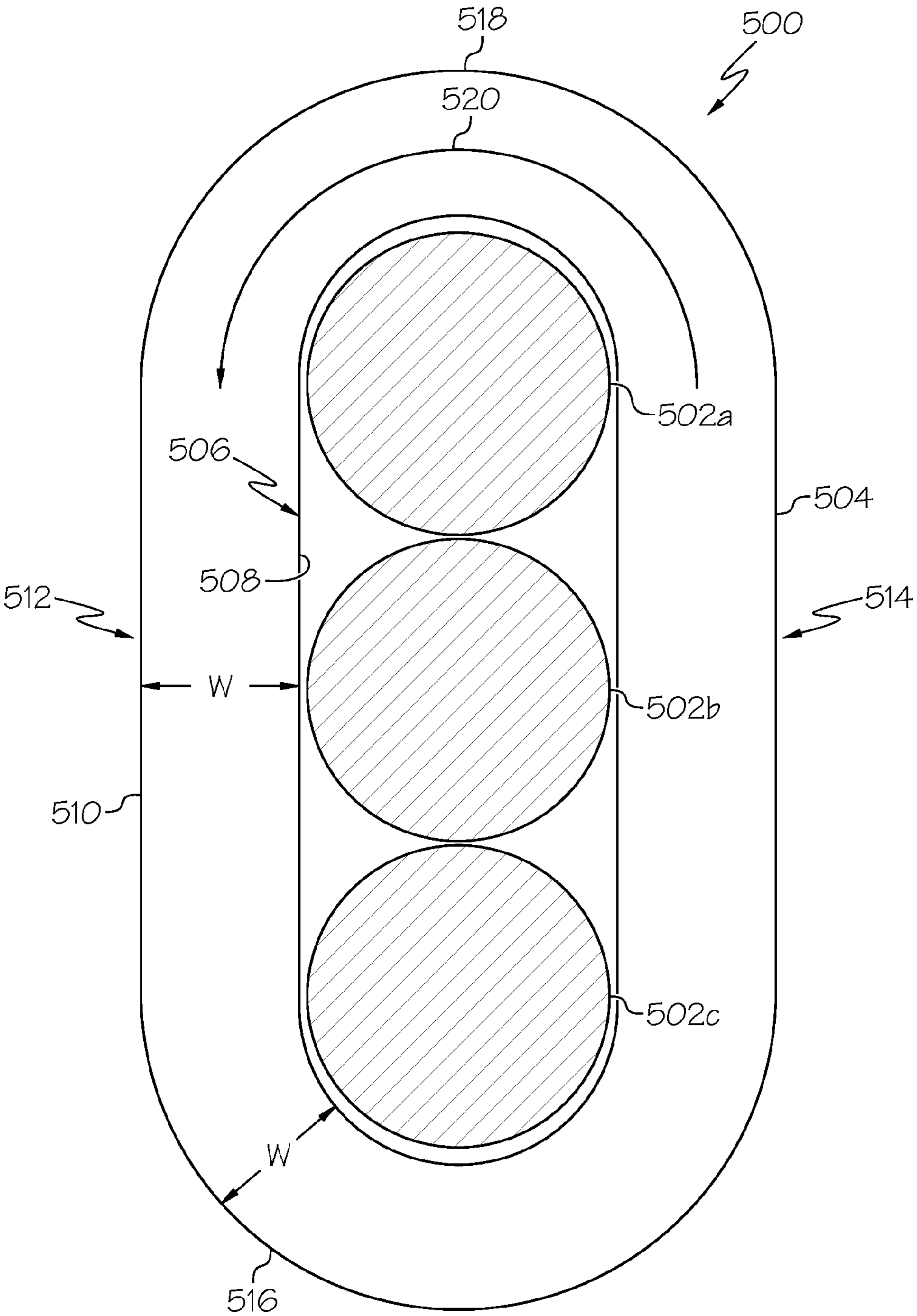
FIG. 5 is an end view of an exemplary device for passively balancing multiple transmission lines in a single phase of an electrical power distribution system in accordance with another embodiment of the present disclosure.

FIG. 5 is an end view of an exemplary device 500 for passively balancing multiple transmission lines 502*a*-502*c* in a single phase of an electrical power distribution system in accordance with another embodiment of the present disclosure. The device 500 may be similar to the device 300 in FIG. 3 including a magnetic core 504 and an opening 506. The opening 506 may include an elongated slot 508. The multiplicity of transmission lines 502*a*-502*c* may each be disposed adjacent one another in the elongated slot 508. Similar to that previously described, a magnetic field is generated around each of the multiple transmission lines 502*a*-502*c* when a current flows through the transmission lines 502a-502c. The opening 506 may be configured for substantially an entirety of the magnetic field being absorbed by the magnetic core 504. The elongated slot 508 may be sized so that minimal open space exists between an edge of the slot 508 and each of the transmission lines 502a-502c. The magnetic core 504 may include a predetermined width "W" from a perimeter edge 510 of the magnetic core 504 to an edge of the elongated slot 508 that is constant about a perimeter of the magnetic core 504. The magnetic core 504 may include two opposite sides 512 and 514 that are each parallel to longitudinal sides of the elongated slot 508 between the two opposite sides 512 and 514. A semicircular end 516 and 518 at each end of the magnetic core 512 joins the two opposite sides 512 and 514.

The magnetic core 504 may be sized relative to a size of the transmission lines 502a-502c so that a sufficient magnitude of magnetic flux 520 flows in the core 504 to generate an equal current in each transmission line 502a-502c when the magnetic flux 520 collapses in the core 504 and passively balances the current load in the multiple transmission lines 502a-502c.

Figure 6:
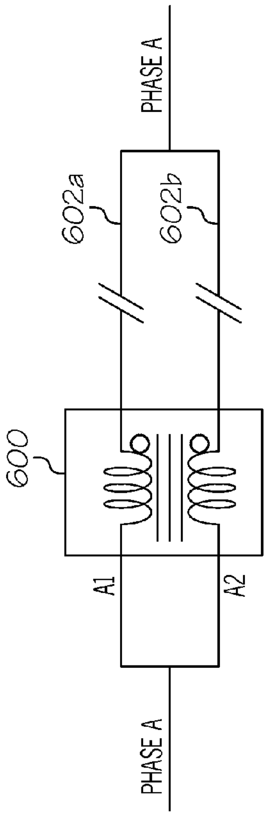
FIG. 6 is a schematic diagram of an example of a device for passively balancing two transmission lines in a single phase of an electrical power distribution system in accordance with an embodiment of the present disclosure.

FIG. 6 is a schematic diagram of an example of a device 600 for passively balancing two transmission lines in a single phase of an electrical power distribution system in accordance with an embodiment of the present disclosure. The device 600 may be similar to the device 300 in FIG. 3 or device 500 in FIG. 5 and my include an opening or elongated slot to accommodate two transmission lines 602a and 602b supporting a single phase. The opening of device 600 may be sized to accommodate exactly the two transmission lines 602a and 602b with minimal open space between the transmission lines 602a and 602b and edges of the opening or slot similar to device 500 so that substantially an entirety of the magnetic field from the transmission lines 602a and 602b is absorbed by the magnetic core. The devices 300 and 500, as previously described operate similar to a linear inductor. Accordingly, device 600 which may be similar to devices 300 and 500 operates the same way and may be schematically represented as a linear inductor with two windings that incorporate each of the transmission lines 602a and 602b.

Figure 7:
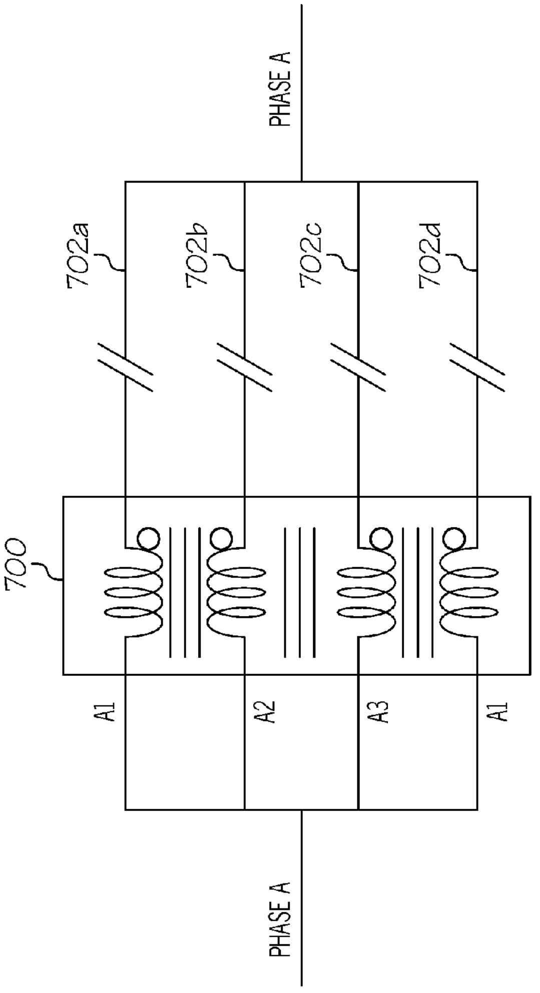
FIG. 7 is a schematic diagram of an example of another device for passively balancing three or more transmission lines in a single phase of an electrical power distribution system in accordance with another embodiment of the present disclosure.

FIG. 7 is a schematic diagram of an example of another device 700 for passively balancing four transmission lines 702a-702d in a single phase of an electrical power distribution system in accordance with another embodiment of the present disclosure. The device 700 may also be configured similar to device 300 in FIG. 3 or device 500 in FIG. 5 except including an opening or elongated slot sized to accommodate four transmission lines 702a-702d for passively balancing the transmission lines 702a-702d. The device 700 may also operate similar to a linear inductor. Therefore, device 700 is represented schematically as a linear inductor in FIG. 7 including four windings incorporating each transmission line 702a-702d.

Figure 8A:
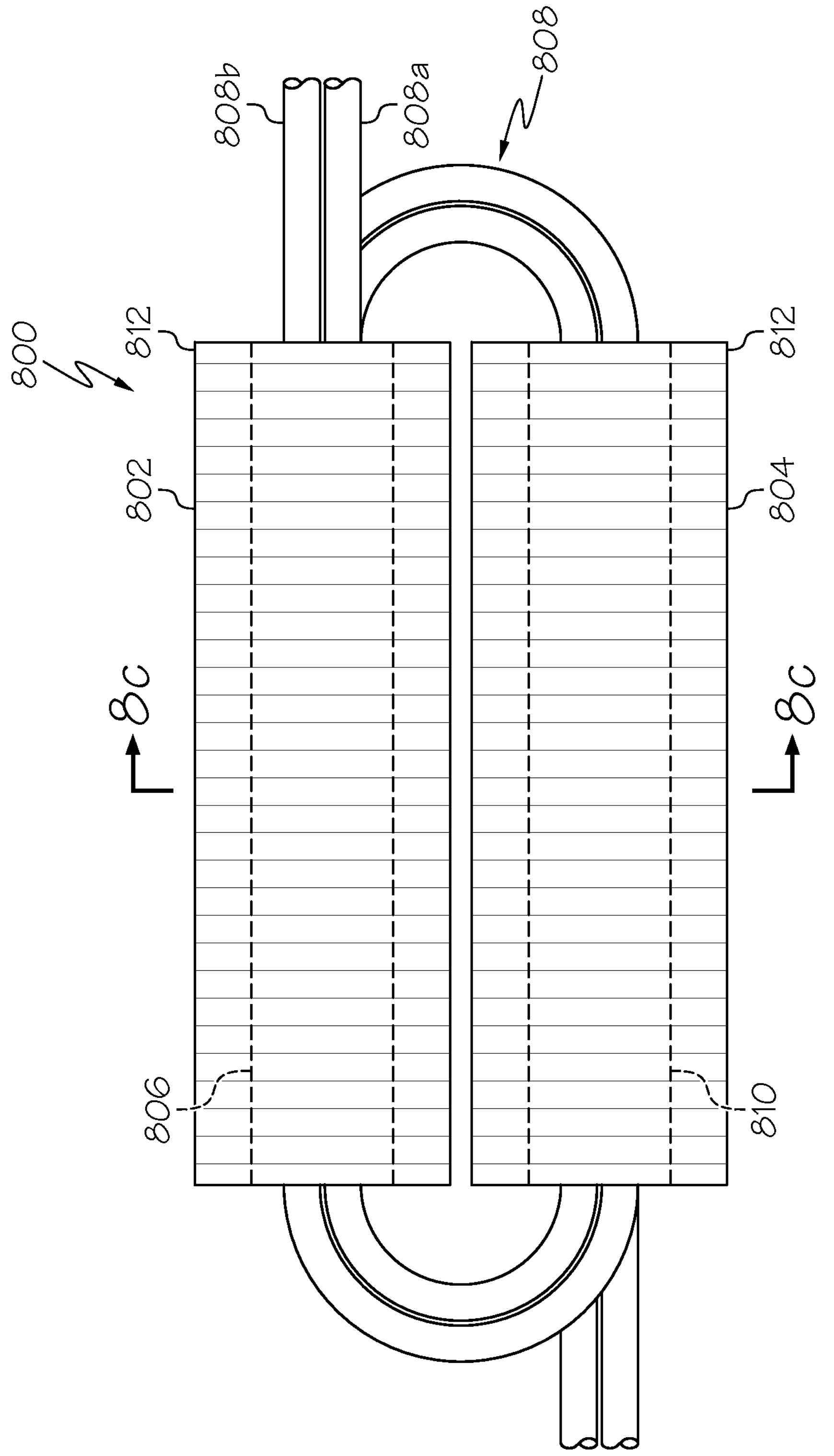
FIG. 8A is a top view of an exemplary device for passively balancing multiple transmission lines in a single phase of an electrical power distribution system in accordance with a further embodiment of the present disclosure.
Figure 8B:
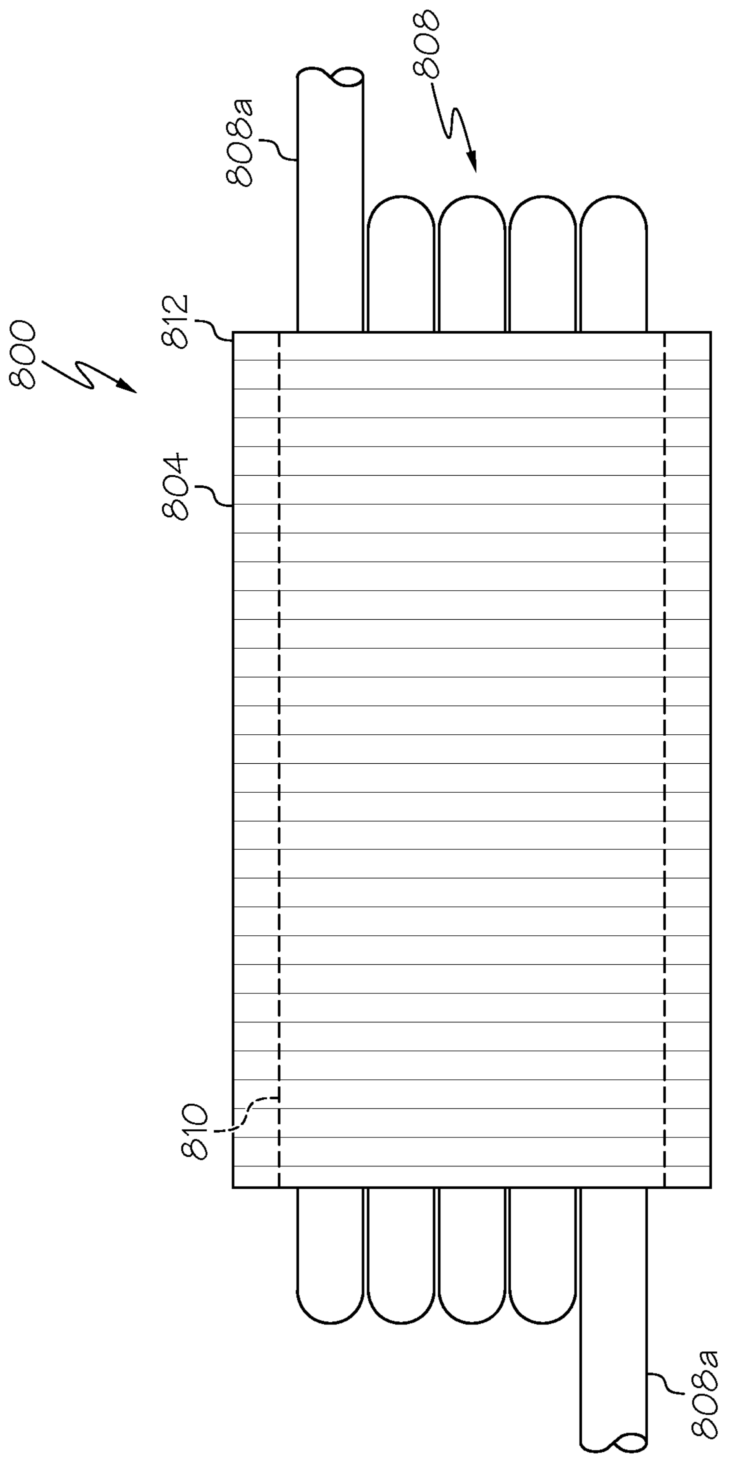
FIG. 8B is a side view of the exemplary device of FIG. 8A.
Figure 8C:
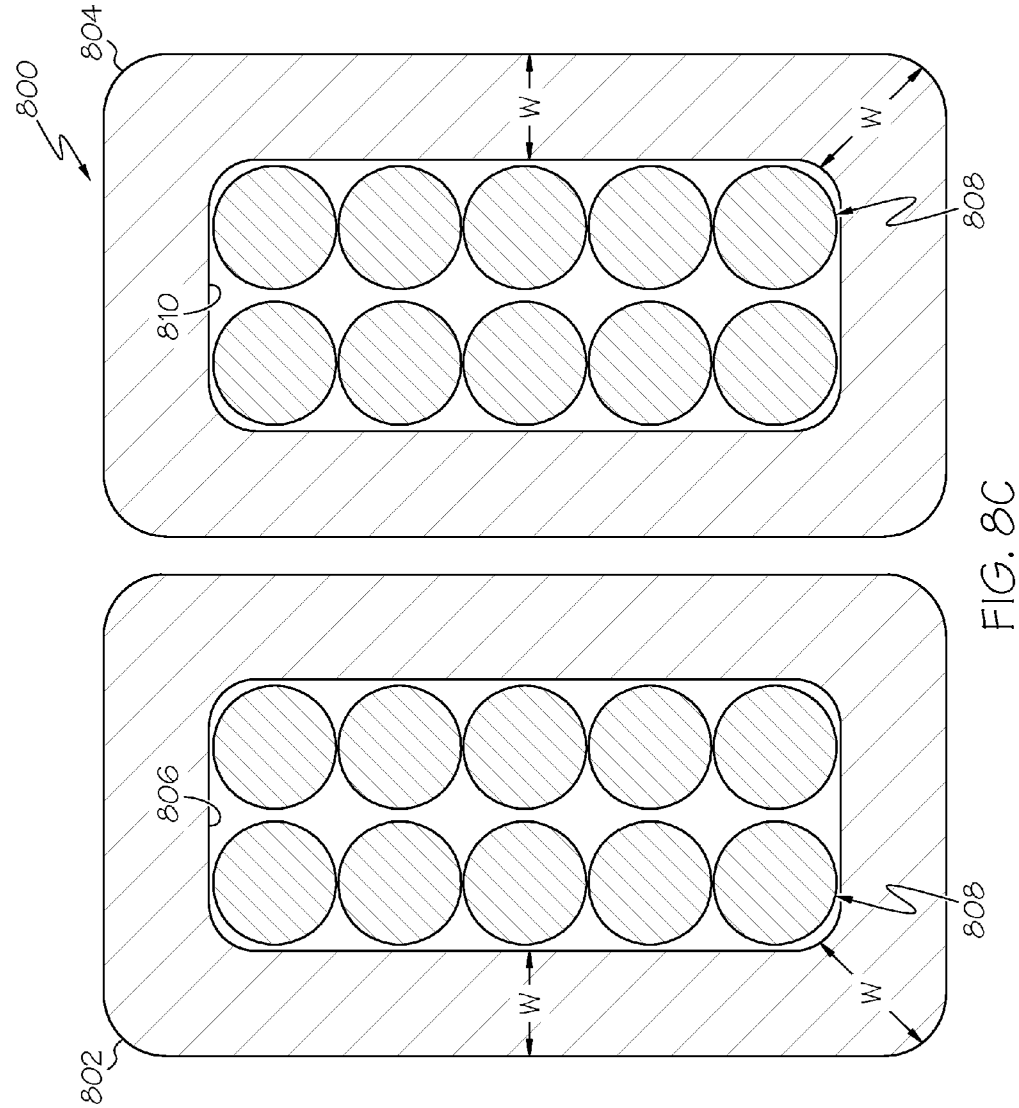
FIG. 8C is cross-sectional view of the exemplary device in FIGS. 8A and 8B taken along lines 8C-8C in FIG. 8B.
Figure 9:
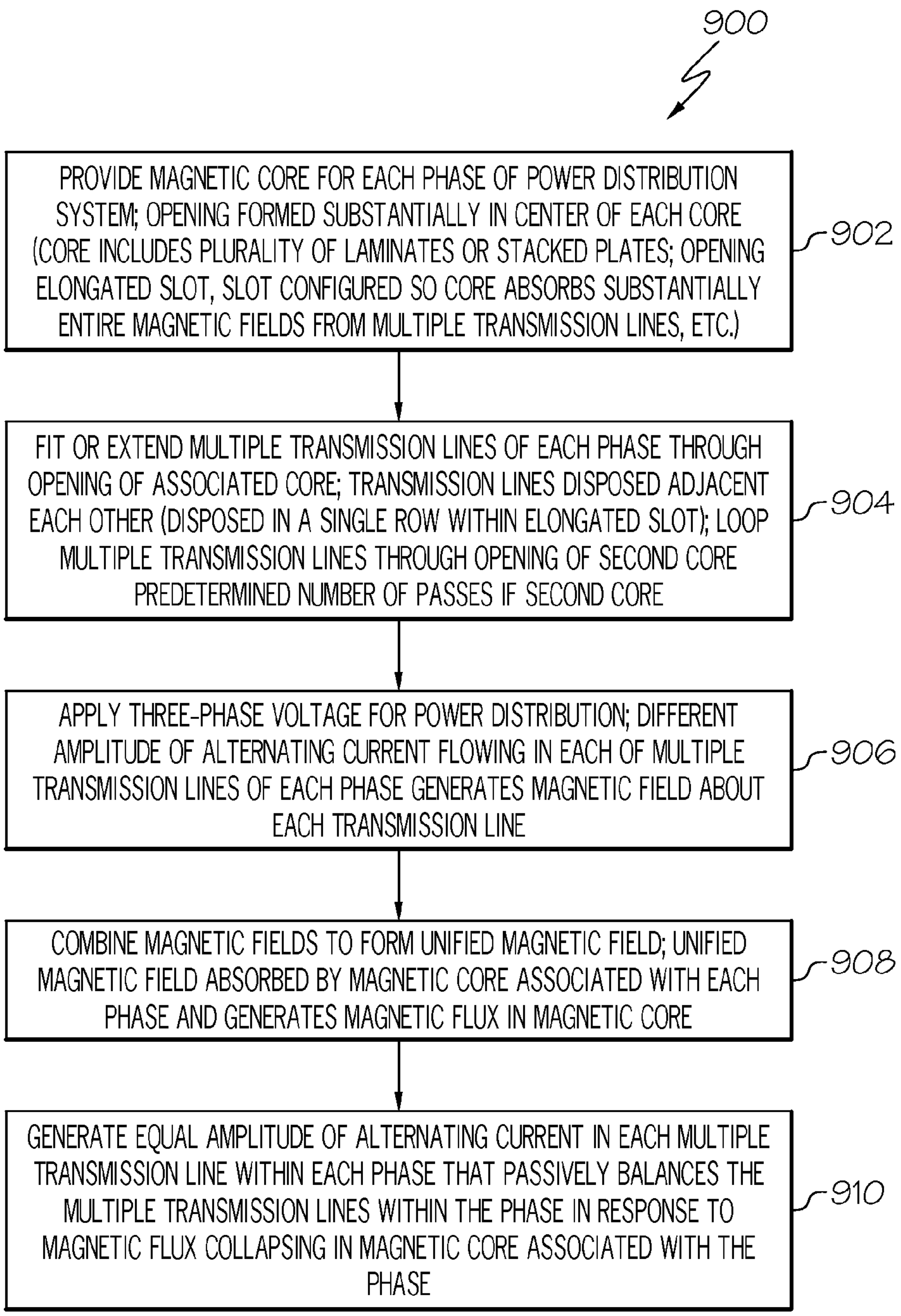
FIG. 9 is a flow chart of an example of a method for passively balancing multiple transmission lines in a single phase of an electrical power distribution system in accordance with an embodiment of the present disclosure.

FIG. 8A is a top view of an exemplary device 800 for passively balancing multiple transmission lines in a single phase of an electrical power distribution system in accordance with a further embodiment of the present disclosure. FIG. 8B is a side view of the exemplary device 800 of FIG. 8A and FIG. 8C is cross-sectional view of the exemplary device 800 in FIGS. 8A and 8B taken along lines 8C-8C in FIG. 8C. The electrical distribution system may be similar to the electrical distribution system 200 in FIG. 2. The device 800 may include a first magnetic core 802 and a second magnetic core 804. The first magnetic core 802 may include an opening 806 for receiving multiple transmission lines 808 supporting a single phase of a three-phase power distribution system. The opening 806 may be an elongated slot. The second magnetic core 804 may include an opening 810 also configured for receiving the multiple transmission lines 808. The opening 810 that may also be an elongated slot. Each magnetic core 802 and 804 may be similar to the magnetic core 302 in FIGS. 3A and 3B or 504 in FIG. 5. Each magnetic core 802 and 804 may be formed by stacking a multiplicity of plates 812 on one another similar to the magnetic core 302. The first magnetic core 802 and the second magnetic core 804 may be disposed adjacent one another. The multiple transmission lines 808 may be looped through the openings 806 and 810 of the first magnetic core 802 and the second magnetic core 804 a predetermined number of passed for generating the equal amplitude of alternating current in each of the multiple transmission lines 808 and passively balancing the multiple transmission lines 808 in response to the magnetic flux collapsing in the magnetic core 802, 804 of each device 802 and 804. The distance traveled by the transmission lines 808 through the magnetic core 804 and the number of passes the transmission lines 808 made through the magnetic core 802 or 804 determines the coupling between the magnetic core and a current flowing in each of the transmission lines for generating the magnetic flux. The greater the distance and/or more passes, the better the coupling and magnitude of magnetic flux flowing in the magnetic core 802 and 804 based on the amount current flowing in the transmission lines 808. The coupling determines the percentage of current balance between the multiple transmission lines 808 of the single phase. In the example shown in FIGS. 8A-8C, a pair of transmission lines 808a and 808b are looped through the magnetic cores 802 and 804 five times or turns. Each of the cores 802 and 804 may have a constant width "W" from an edge of the openings 806 and 810 to an exterior perimeter FIG. 9 is a flow chart of an example of a method 900 for passively balancing multiple transmission lines in a single phase of an electrical power distribution system in accordance with an embodiment of the present disclosure. In block 902, a magnetic core may be provided for each phase of an electrical power distribution system. An opening may be form substantially in a center of each magnetic core. Each magnetic core may include a plurality of laminates or stacked plates. Openings in each of the laminates or stacked plates will align with one another to form the opening when the laminates or plates are stacked on one another to form the core. The opening may be an elongated slot and maybe configured so that the core absorbs substantially an entire magnetic field when a current is flowing through the multiple transmission lines.

In block 904, the multiple transmission lines of each phase may be fit or extended through the opening of an associated magnetic core. The transmission lines may be disposed adjacent one another. If the opening is an elongated slot, the transmission lines may be disposed in a single row within the elongated slot. In accordance with an embodiment, the multiple transmission lines may be looped through an opening of a second magnetic core a predetermined number of passes. The distance traveled by the transmission lines through the first and second magnetic cores and the number of passes the transmission lines make through each magnetic core determines the coupling between the magnetic core and a current flowing in each of the transmission lines for generating the magnetic flux. The greater the distance and/or more passes, the better the coupling and generation of magnetic flux flow in the magnetic core based on the current flowing in the transmission lines. The coupling determines the percentage of current balance between the multiple transmission lines of the single phase.

In block 906, a three-phase voltage may be applied to the power distribution system. A different amplitude of alternating current may flow in each of the multiple transmission lines of each phase. The alternating current generates a magnetic field about each transmission line.

In block 908, the magnetic field generated by the current flowing in each transmission line of a phase may combine to form a unified magnetic field. The unified magnetic field may be absorbed by the magnetic core associated with each phase. A magnetic flux is generated in the magnetic core in response to absorbing the magnetic fields from each transmission line or unified magnetic field.

In block 910, an equal amplitude of alternating current is generated in each multiple transmission line within each phase in response to the magnetic flux collapsing in the magnetic core associated with the phase similar to that previously described herein. The multiple transmission lines within a phase are passively balanced by generating the equal amplitude of alternating current in each transmission line within a phase when the magnetic flux collapses.

The flowchart and block diagrams in the Figures illustrate the architecture, functionality, and operation of possible implementations of systems and methods according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware.

The terminology used herein is for the purpose of describing particular embodiments only and is not intended to be limiting of embodiments of the disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A device for passively balancing multiple transmission lines forming a single phase of an electrical power distribution system, the device comprising:

a magnetic core in which a magnetic flux is generable; and an opening through the magnetic core, the opening being configured for receiving the multiple transmission lines that form the single phase of the electrical power distribution system, wherein a different amplitude of alternating current flowing in each of the multiple transmission lines generates a magnetic field about each of the multiple transmission lines that has a magnitude corresponding to the amplitude of the alternating current, the magnetic fields from the multiple transmission lines are absorbed by the magnetic core and generate a magnetic flux in the magnetic core, an equal amplitude of alternating current being generated in each of the multiple transmission lines for passively balancing the multiple transmission lines in response to the magnetic flux collapsing in the magnetic core.

2. The device of claim 1, wherein the opening is configured for substantially an entirety of the magnetic fields from the multiple power transmission lines being absorbed by the magnetic core.

3. The device of claim 1, wherein the opening comprises an elongated slot, the multiplicity of electrical power transmission lines being each disposed adjacent one another within the elongated slot.

4. The device of claim 3, wherein the magnetic core comprises a predetermined width from a perimeter edge of the magnetic core to the elongated slot that is constant about a perimeter of the magnetic core.

5. The device of claim 4, wherein the magnetic core comprises:

two opposite sides that are each parallel to longitudinal sides of the elongated slot between the two opposite sides; and a semicircular end at each end of the magnetic core that joins the two opposite sides.

6. The device of claim 1, wherein the magnetic core comprises a plurality of plates stacked directly on one another, each of the plurality of plates comprising a metallic material capable of generating a magnetic flux.

7. The device of claim 1, wherein the magnetic core comprises one of a silicon steel alloy core and a nickel-iron alloy core.

8. The device of claim 1, wherein a length of each of the multiple transmission lines is a predetermined number of miles.

9. The device of claim 1, wherein the opening is sized to accommodate an exact number of transmission lines passing through the opening.

10. The device of claim 1, wherein a number of the multiple transmission lines are between two transmission lines and six transmission lines and wherein the opening is sized to accommodate an exact number of transmission lines passing through the opening.

11. The device of claim 1, further comprising:

a second magnetic core adjacent the magnetic core; and a second opening through the second magnetic core, wherein the multiple transmission lines are looped through the openings of the magnetic core and the second magnetic core a predetermined number of passed for generating the equal amplitude of alternating current in each of the multiple transmission lines.

12. The device of claim 11, wherein a distance traveled by the multiple transmission lines through the magnetic core and the second magnetic core and the predetermined number of passes defines a level of coupling of the magnetic flux between the magnetic cores and the alternating current in each of the multiple transmission lines.

13. A system for electrical power distribution, comprising:

a three-phase transformer that receives electrical power generated by a power generator;

a power distribution transformer;

a three-phase power line distribution system coupling the three-phase transformer to the power distribution transformer, each phase of the three-phase power line distribution system comprising multiple transmission lines; and a device associated each phase of the three-phase power line distribution system for passively balancing the multiple transmission lines forming each phase.

14. The system of claim 13, wherein the device comprises:

a magnetic core in which a magnetic flux is generable; and an opening through the magnetic core, the opening being configured for receiving the multiple transmission lines that form a single phase of the electrical power distribution system, wherein a different amplitude of alternating current flowing in each of the multiple transmission lines generates a magnetic field about each of the multiple transmission lines that has a magnitude corresponding to the amplitude of the alternating current, the magnetic fields from the multiple transmission lines are absorbed by the magnetic core and generate a magnetic flux in the magnetic core, an equal amplitude of alternating current being generated in each of the multiple transmission lines for passively balancing the multiple transmission lines in response to the magnetic flux collapsing in the magnetic core.

15. The system of claim 14, wherein the opening comprises an elongated slot, the multiplicity of electrical power transmission lines being each disposed adjacent one another within the elongated slot, and wherein the magnetic core comprises a predetermined width from a perimeter edge of the magnetic core to the elongated slot that is constant about a perimeter of the magnetic core.

16. The system of claim 14, wherein the device further comprises:

a second magnetic core adjacent the magnetic core; and a second opening through the second magnetic core, wherein the multiple transmission lines are looped through the openings of the magnetic core and the second magnetic core a predetermined number of passed for generating the equal amplitude of alternating current in each of the multiple transmission lines.

17. A method for passively balancing multiple transmission lines that form each phase of a three-phase electrical power distribution system, the method comprising:

providing a magnetic core in which a magnetic flux is generable for each phase;

fitting the multiple transmission lines of each phase in an opening through the magnetic core associated with each phase, wherein a different amplitude of alternating current flowing in each of the multiple transmission lines of a particular phase generates a magnetic field about each of the multiple transmission lines of the particular phase that has a magnitude corresponding to the amplitude of the alternating current, the magnetic fields from the multiple transmission lines are absorbed by the magnetic core of the particular phase and generate the magnetic flux in the magnetic core, an equal amplitude of alternating current being generated in each of the multiple transmission lines of the particular phase for passively balancing the multiple transmission lines of particular phase in response to the magnetic flux collapsing in the magnetic core.

18. The method of claim 17, wherein fitting the multiple transmission lines of each phase in the opening comprises fitting the multiple transmission lines in an elongated slot, the multiplicity of electrical power transmission lines being each disposed adjacent one another within the elongated slot.

19. The method of claim 17, wherein the magnetic core comprises a predetermined width from a perimeter edge of the magnetic core to the elongated slot that is constant about a perimeter of the magnetic core.

20. The method of claim 19, wherein providing the magnetic core comprises:

providing the magnetic core including two opposite sides that are each parallel to longitudinal sides of the elongated slot between the two opposite sides; and providing a semicircular end at each end of the magnetic core that joins the two opposite sides.

* * * * *